United States Patent
Kichise et al.

(10) Patent No.: US 10,234,349 B2
(45) Date of Patent: Mar. 19, 2019

(54) SENSOR SYSTEM

(71) Applicant: JTEKT CORPORATION, Osaka-shi, Osaka (JP)

(72) Inventors: Hiroshi Kichise, Kariya (JP); Yoshitomo Tokumoto, Nabari (JP); Kazuya Sakai, Kariya (JP); Yutaro Ishimoto, Kashiwara (JP); Kaname Aoki, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 404 days.

(21) Appl. No.: 14/920,305

(22) Filed: Oct. 22, 2015

(65) Prior Publication Data

US 2016/0123823 A1 May 5, 2016

(30) Foreign Application Priority Data

Oct. 31, 2014 (JP) .................................. 2014-223146

(51) Int. Cl.
*G01L 5/22* (2006.01)
*G01L 3/10* (2006.01)
(Continued)

(52) U.S. Cl.
CPC ................ *G01L 5/221* (2013.01); *B62D 6/10* (2013.01); *G01D 3/08* (2013.01); *G01D 21/00* (2013.01);
(Continued)

(58) Field of Classification Search
CPC ........... G01L 5/221; G01L 3/101; B62D 6/10; G08C 25/00; G01D 3/08; G01D 21/00; H04Q 9/00; H04Q 2209/823
See application file for complete search history.

(56) References Cited

U.S. PATENT DOCUMENTS 7,423,397 B2 * 9/2008 Katahira ................ B62D 5/049
318/432
7,444,217 B2 * 10/2008 Matsuoka .............. B62D 5/049
701/31.1
(Continued)

FOREIGN PATENT DOCUMENTS

EP 0 180 085 A2 5/1986
EP 2 672 233 A2 12/2013
(Continued)

OTHER PUBLICATIONS

Mar. 3, 2016 Extended Search Report issued in European Patent Application No. 15191952.9.

*Primary Examiner* — Jill E Culler
*Assistant Examiner* — Leo T Hinze
(74) *Attorney, Agent, or Firm* — Oliff PLC

(57) ABSTRACT

Provided is a sensor system capable of more accurately detecting abnormality. A sensor IC includes a first detector, a second detector, and a communication circuit. The first detector and the second detector output a first digital value and a second digital value according to the strength of a magnetic flux applied thereto, respectively. The communication circuit transmits the first and second digital values received from the first and second detectors to a control device. At this time, the communication circuit places the first and second digital values in a plurality of frames to transmit the plurality of frames. The communication circuit forms the plurality of frames such that bit information data of the first and second digital values placed in the frames is arranged in different orders between the first and second digital values.

6 Claims, 8 Drawing Sheets

(51) Int. Cl.
*G01D 21/00* (2006.01)
*G01D 3/08* (2006.01)
*G08C 25/00* (2006.01)
*H04Q 9/00* (2006.01)
*B62D 6/10* (2006.01)

(52) U.S. Cl.
CPC .............. *G01L 3/101* (2013.01); *G08C 25/00* (2013.01); *H04Q 9/00* (2013.01); *H04Q 2209/823* (2013.01)

(56) References Cited

U.S. PATENT DOCUMENTS

| | | | |
|---|---|---|---|
| 9,346,488 B2* | 5/2016 | Kozawa | ................. B62D 5/049 |
| 2012/0074972 A1 | 3/2012 | Rasbornig et al. | |
| 2013/0255401 A1* | 10/2013 | Ishimoto | ................. G01L 3/104 |
| | | | 73/862.325 |
| 2013/0319100 A1* | 12/2013 | Kichise | ................. G01M 17/06 |
| | | | 73/117.02 |

FOREIGN PATENT DOCUMENTS

| | | |
|---|---|---|
| JP | 2012 068248 A | 4/2012 |
| JP | 2012-068248 A | 4/2012 |
| JP | 5474018 B2 | 4/2014 |
| WO | 2008/021931 A1 | 2/2008 |

\* cited by examiner

F I G . 3
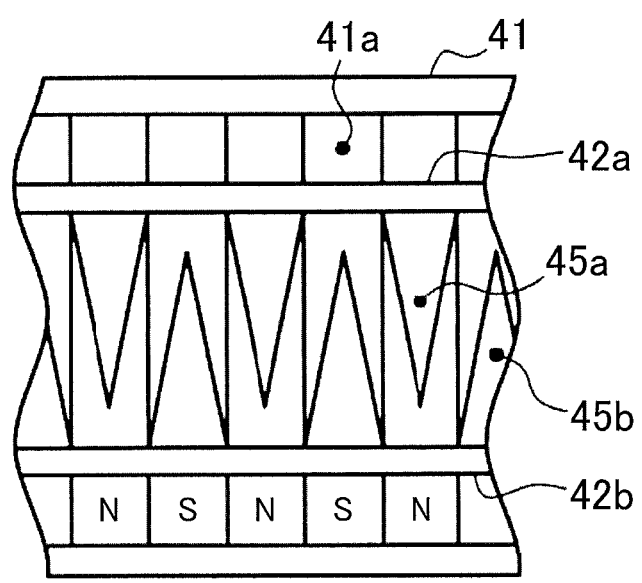

FIG. 5

| | D0 | D1 | D2 | D3 | D4 | D5 | D6 | D7 | D8 |
|---|---|---|---|---|---|---|---|---|---|
| FIRST FRAME F1 | Da(8) | Da(7) | Da(6) | Da(5) | Da(4) | Da(3) | Da(2) | Da(1) | Da(0) |
| SECOND FRAME F2 | Db(3) | Db(2) | Db(1) | Db(0) | Da(12) | Da(11) | Da(10) | Da(9) | Id |
| THIRD FRAME F3 | Db(12) | Db(11) | Db(10) | Db(9) | Db(8) | Db(7) | Db(6) | Db(5) | Db(4) |
| FOURTH FRAME F4 | Ca | | Cb | | | Edc | | | |

FIG. 7

| | D0 | D1 | D2 | D3 (FIXING ABNORMALITY) | D4 | D5 | D6 | D7 | D8 | |
|---|---|---|---|---|---|---|---|---|---|---|
| FIRST FRAME F1 | Da(8) | Da(7) | Da(6) | | Da(4) | Da(3) | Da(2) | Da(1) | Da(0) | |
| SECOND FRAME F2 | Db(3) | Db(2) | Db(1) | 1 | Da(12) | Da(11) | Da(10) | Da(9) | Id | Edc |
| THIRD FRAME F3 | Db(12) | Db(11) | Db(10) | 1 | Db(8) | Db(7) | Db(6) | Db(5) | Db(4) | |
| FOURTH FRAME F4 | Ca | | Cb | 1 | | | | | | |

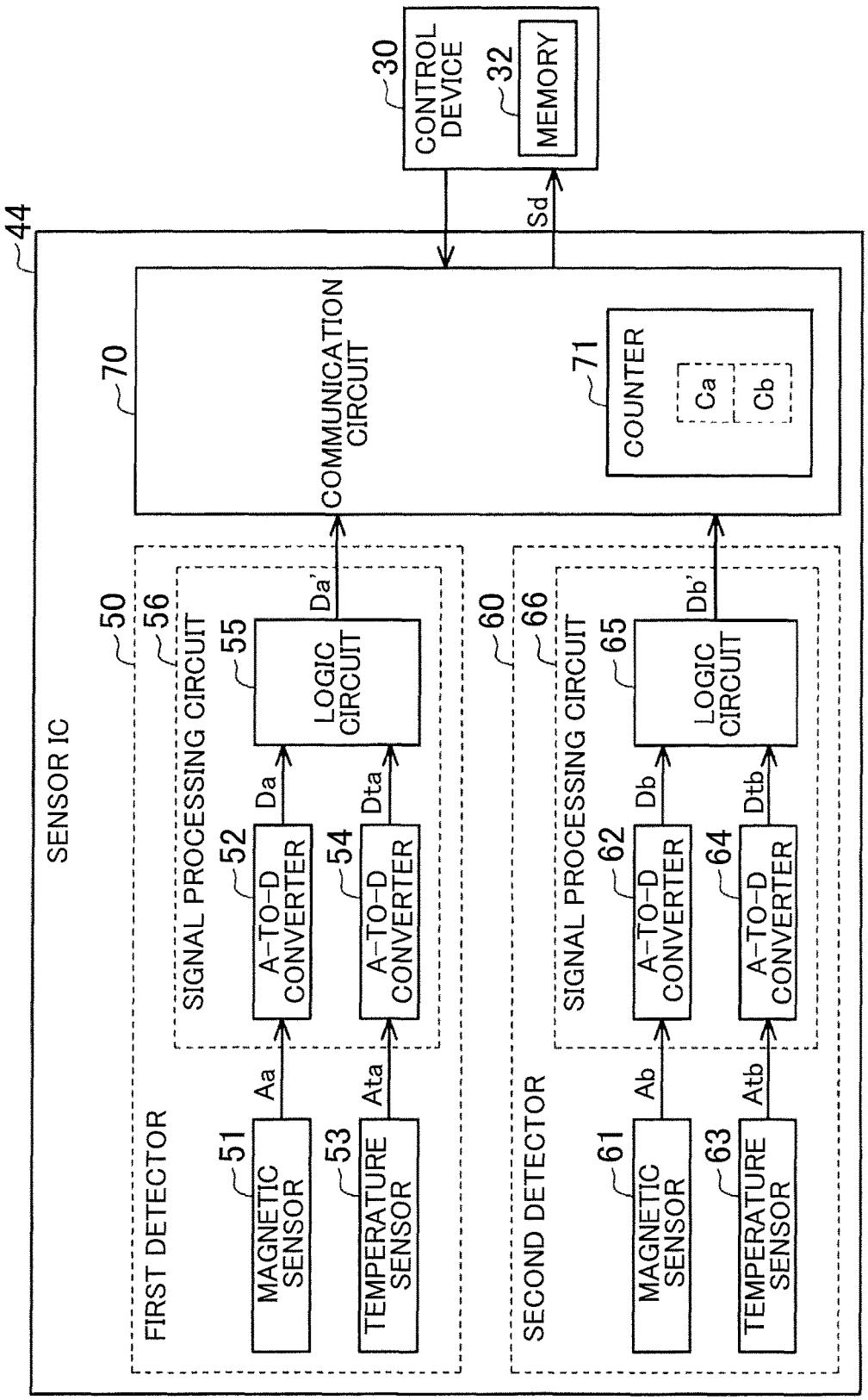

SENSOR SYSTEM

INCORPORATION BY REFERENCE

The disclosure of Japanese Patent Application No. 2014-223146 filed on Oct. 31, 2014 including the specification, drawings and abstract, is incorporated herein by reference in its entirety.

BACKGROUND OF THE INVENTION

1. Field of the Invention

The present invention relates to sensor systems.

2. Description of the Related Art

An example of sensor systems is a sensor system using a sensor integrated circuit (IC) described in Japanese Patent No. 5474018 (JP 5474018 B2). The sensor IC described in JP 5474018 B2 includes two sensors, analog-to-digital (A-to-D) converters, and a digital signal processor (DSP). The two sensors detect the same physical quantity such as a magnetic flux and each output an analog value according to the detected physical quantity. The A-to-D converters convert the analog values received from the two sensors to digital values. The DSP performs a predetermined computation of the digital values received from the A-to-D converters. The sensor IC transmits the digital values received from the DSP to a communication target via a communication circuit.

By using the sensor IC described in JP 5474018 B2, the communication target that receives digital values can obtain, e.g., first and second digital values corresponding to output values of the two sensors from the sensor IC and detect abnormality of the sensor IC by comparing the digital values. However, in the case of using this configuration, abnormality of the communication circuit may not be able to be detected if the communication circuit transmits the first and second digital values with the same frame configuration to the communication target. For example, if the communication circuit has such abnormality that bit information of a specific data bit in each frame is fixed to zero or one, the first and second digital values that are transmitted from the communication circuit are abnormal values. However, since abnormality occurs at the same location in the frame including the first digital value and in the frame including the second digital value, the first and second digital values that are abnormal values may be the same value. The communication target therefore cannot detect the difference between the first and second digital values when comparing the first and second digital values with each other, and thus the abnormality of the communication circuit may not be able to be detected.

SUMMARY OF THE INVENTION

It is one object of the present invention to provide a sensor system capable of more accurately detecting abnormality.

According to one aspect of the present invention, a sensor system includes: a plurality of detectors that detect the same physical quantity of the same detection target and output a digital value according to the detected physical quantity; a communication circuit that transmits a plurality of the digital values received from the plurality of detectors; and an arithmetic unit that receives the digital values from the communication circuit; wherein, the communication circuit places the plurality of the digital values in a plurality of frames to transmit the plurality of frames, and forms the plurality of frames such that bit information data of the plurality of digital values placed in the plurality of frames is arranged in different orders between or among the plurality of the digital values.

With this configuration, if the communication circuit has such abnormality that a predetermined data bit of each frame is fixed to zero or one, the digital values are completely different values. The arithmetic unit can therefore detect the abnormality of the communication circuit as the digital values are different from each other as a result of comparison.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is a development view of yokes and a holding member of the sensor system according to the embodiment on a plane.

FIG. 5 is a table showing an example of the frame configuration of a detection signal of the sensor system according to the embodiment;

FIG. 7 is a table showing an example of the frame configuration of the detection signal in the case where a communication circuit of the sensor system according to the embodiment has abnormality; and FIG. 8 is a block diagram showing the configuration of a sensor IC in a sensor system according to another embodiment.

DETAILED DESCRIPTION OF EMBODIMENTS

Figure 1:
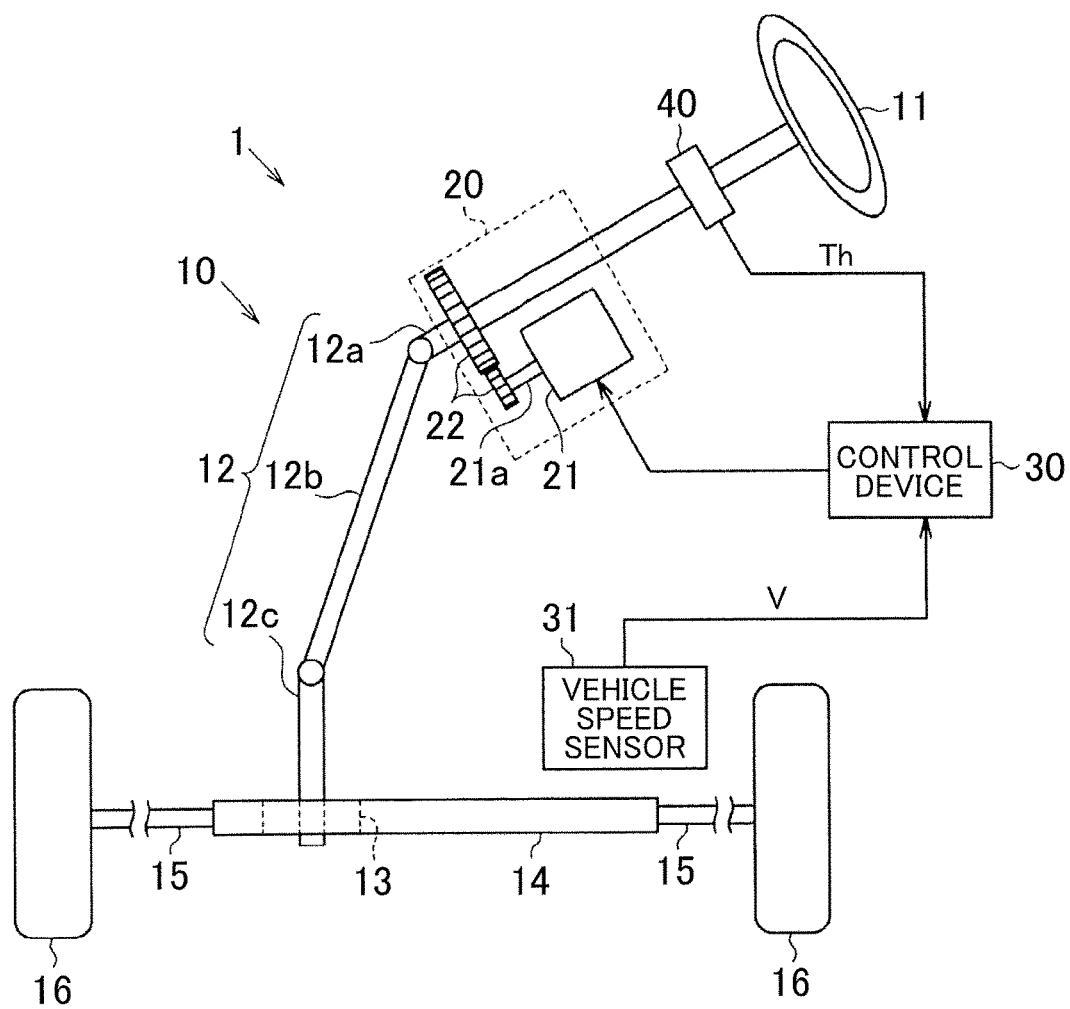
FIG. 1 is a block diagram showing the general structure of an electric power steering system.

An embodiment of the present invention which is mounted on an electric power steering system will be described below. First, the electric power steering system will be roughly described. As shown in FIG. 1, an electric power steering system 1 includes a steering mechanism 10, an assist mechanism 20, and a control device 30. The steering mechanism 10 steers steered wheels 16 based on an operation of a steering wheel 11 by the driver. The assist mechanism 20 applies an assist force to the steering mechanism 10 by a motor 21. The control device 30 controls driving of the motor 21. The control device 30 corresponds to an arithmetic unit of the present invention.

The steering mechanism 10 has a steering shaft 12 coupled to the steering wheel 11, The steering shaft 12 is formed by coupling a column shaft 12a, an intermediate shaft 12b, and a pinion shaft 12c in this order from the steering wheel 11 side. The lower end of the pinion shaft 12c is coupled to a rack shaft 14 via a rack and pinion mechanism 13. When the steering shaft 12 of the steering mechanism 10 is rotated according to the operation of the steering wheel 11 by the driver, the rotary motion of the steering shaft 12 is converted to an axial reciprocating linear motion of the rack shaft 14 via the rack and pinion mechanism 13. This axial reciprocating linear motion of the rack shaft 14 is transmitted to the steered wheels 16 via tie rods 15 coupled to both ends of the rack shaft 14. The steered angle of the steered wheels 16 is thus changed and the traveling direction of a vehicle is changed.

The assist mechanism 20 includes the motor 21 and a speed reducer 22. The speed reducer 22 reduces the rotational speed of an output shaft 21a of the motor 21 and transmits the resultant rotation to the column shaft 12a. The assist mechanism 20 transmits the rotation of the output shaft 21 a of the motor 21 to the column shaft 12a via the speed reducer 22 to apply an assist force (assist torque) to the steering shaft 12.

The electric power steering system 1 is provided with various sensors that detect the state quantity of the vehicle and the amount of operation by the driver. For example, the steering shaft 12 is provided with a torque sensor 40 that detects steering torque Th applied to the steering shaft 12 when the driver performs a steering operation. The vehicle is provided with a vehicle speed sensor 31 that detects a vehicle speed V as a traveling speed of the vehicle. The outputs of the sensors 31, 40 are transmitted to the control device 30. The control device 30 computes a current command value based on the steering torque Th and the vehicle speed V which are detected by the sensors 31, 40. The current command value is a target value of a current that is supplied to the motor 21. The control device 30 controls driving of the motor 21 by performing current feedback control of causing the value of a current that is supplied to the motor 21 to follow the current command value. The control device 30 and the torque sensor 40 form a sensor system.

Figure 2:
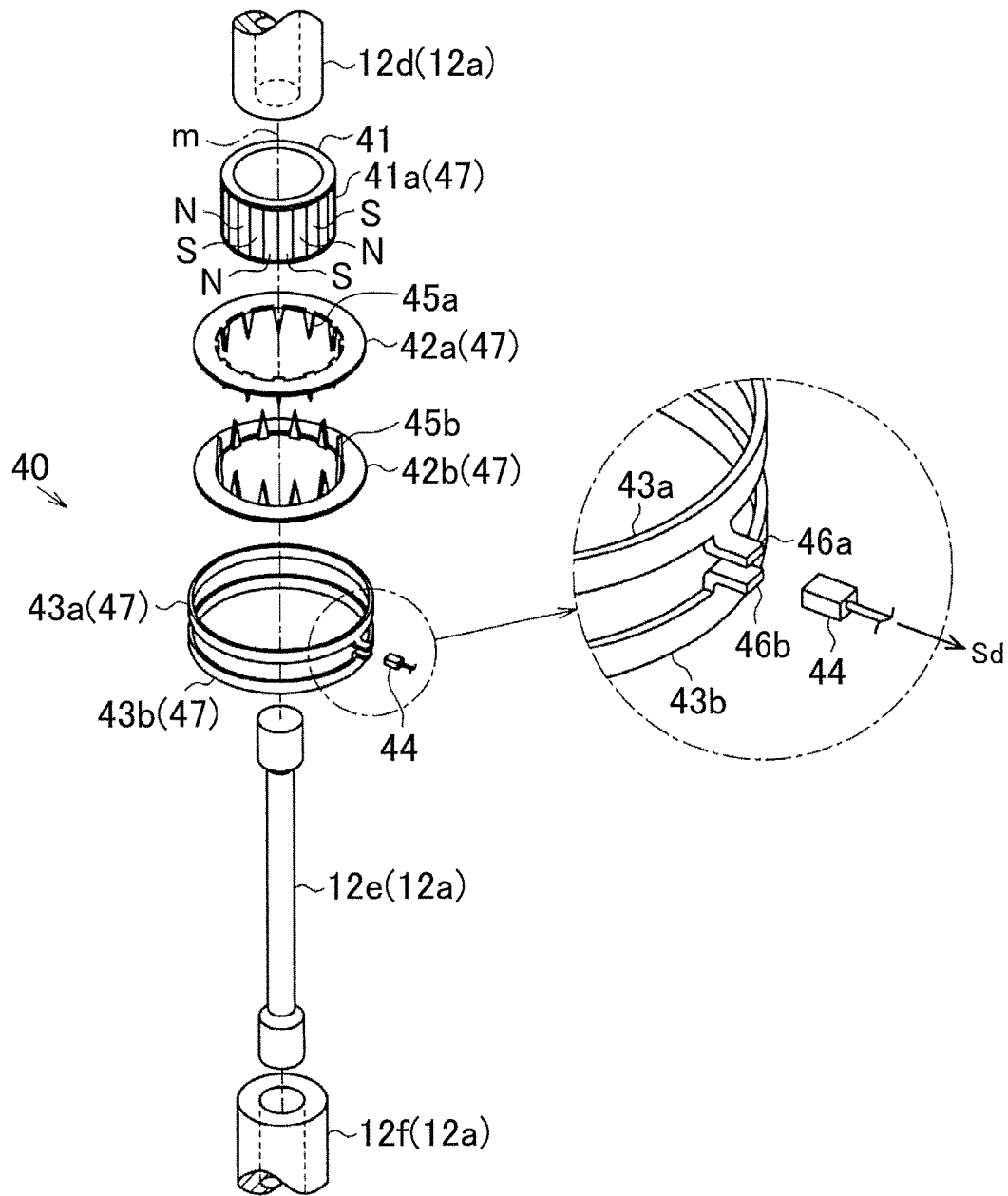
FIG. 2 is an exploded perspective view showing the structure of a sensor system according to an embodiment of the present invention.

The structure of the torque sensor 40 will be described in detail below. As shown in FIG. 2, the column shaft 12a is formed by coupling an input shaft 12d, a torsion bar 12e, and a lower shaft 12f on the same axis m. The input shaft 12d is coupled to the steering wheel 11. The lower shaft 12f is coupled to the intermediate shaft 12b. Accordingly, when the driver operates the steering wheel 11 and the steering torque Th applied to the input shaft 12d is transmitted to the lower shaft 12f via the torsion bar 12e, the torsion bar 12e is torsionally deformed. At this time, a relative rotational displacement occurs between the input shaft 12d and the lower shaft 12f according to the steering torque Th.

The torque sensor 40 includes a cylindrical holding member 41, an annular first yoke 42a, an annular second yoke 42b, an annular first magnetic flux collecting ring 43a, and an annular second magnetic flux collecting ring 43b, and a sensor IC 44.

The holding member 41 is fixed to the outer periphery of the lower end of the input shaft 12d. The holding member 41 thus rotates together with the input shaft 12d. A multipolar magnet 41 a is disposed in the outer peripheral portion of the holding member 41. The multipolar magnet 41 a is structured so that north poles and south poles are alternately arranged in the circumferential direction of the holding member 41.

The first yoke 42a and the second yoke 42b are disposed around the holding member 41 with predetermined clearance between each yoke 42a, 42b and the holding member 41. The yokes 42a, 42b are fixed to the lower shaft 12f via a joint structure, not shown. The yokes 42a, 42b thus rotate together with the lower shaft 12f. The yokes 42a, 42b are disposed so as to face each other with predetermined clearance therebetween in the direction of the axis m. The first yoke 42a has a plurality of pawls 45a formed on its inner peripheral surface such that the pawls 45a extend toward the second yoke 42b. The second yoke 42b has a plurality of pawls 45b formed on its inner peripheral surface such that the pawls 45b extend toward the first yoke 42a. FIG. 3 is a development view of the holding member 41 and the yokes 42a, 42b on a plane. As shown in FIG. 3, the pawls 45a, 45b of the first and second yokes 42a, 42b are alternately arranged in the circumferential direction and face the multipolar magnet 41a with the predetermined clearance therebetween.

The first magnetic flux collecting ring 43a is disposed around the first yoke 42a with predetermined clearance therebetween. The second magnetic flux collecting ring 43b is disposed around the second yoke 42b with predetermined clearance therebetween. Each of the magnetic flux collecting rings 43a, 43b is made of a magnetic material. As shown enlarged in the figure, the first magnetic flux collecting ring 43a has a magnetic flux collecting part 46a, and the second magnetic flux collecting ring 43b has a magnetic flux collecting part 46b. The magnetic flux collecting parts 46a, 46b are disposed so as to face each other with predetermined clearance therebetween in the direction of the axis m. In the present embodiment, a magnetic circuit 47 is formed by the multipolar magnet 41a, the yokes 42a, 42b, and the magnetic flux collecting rings 43a, 43b.

The sensor IC 44 is disposed between the magnetic flux collecting parts 46a, 46b. The sensor IC 44 is mainly formed by a Hall element, and outputs a detection signal Sd according to the strength of a magnetic flux (magnetic field) applied thereto.

When a relative rotational displacement occurs between the input shaft 12d and the lower shaft 12f according to the steering torque Th applied to the input shaft 12d, the positional relationship between the holding member 41 and each yoke 42a, 42b in the torque sensor 40 changes and the magnetic flux collected by each yoke 42a, 42b changes accordingly. The strength of a magnetic flux that is applied to the sensor IC 44 changes accordingly. The detection signal Sd that is output from the sensor IC 44 is therefore a signal that changes according to the torsion angle of the torsion bar 12e.

Figure 4:
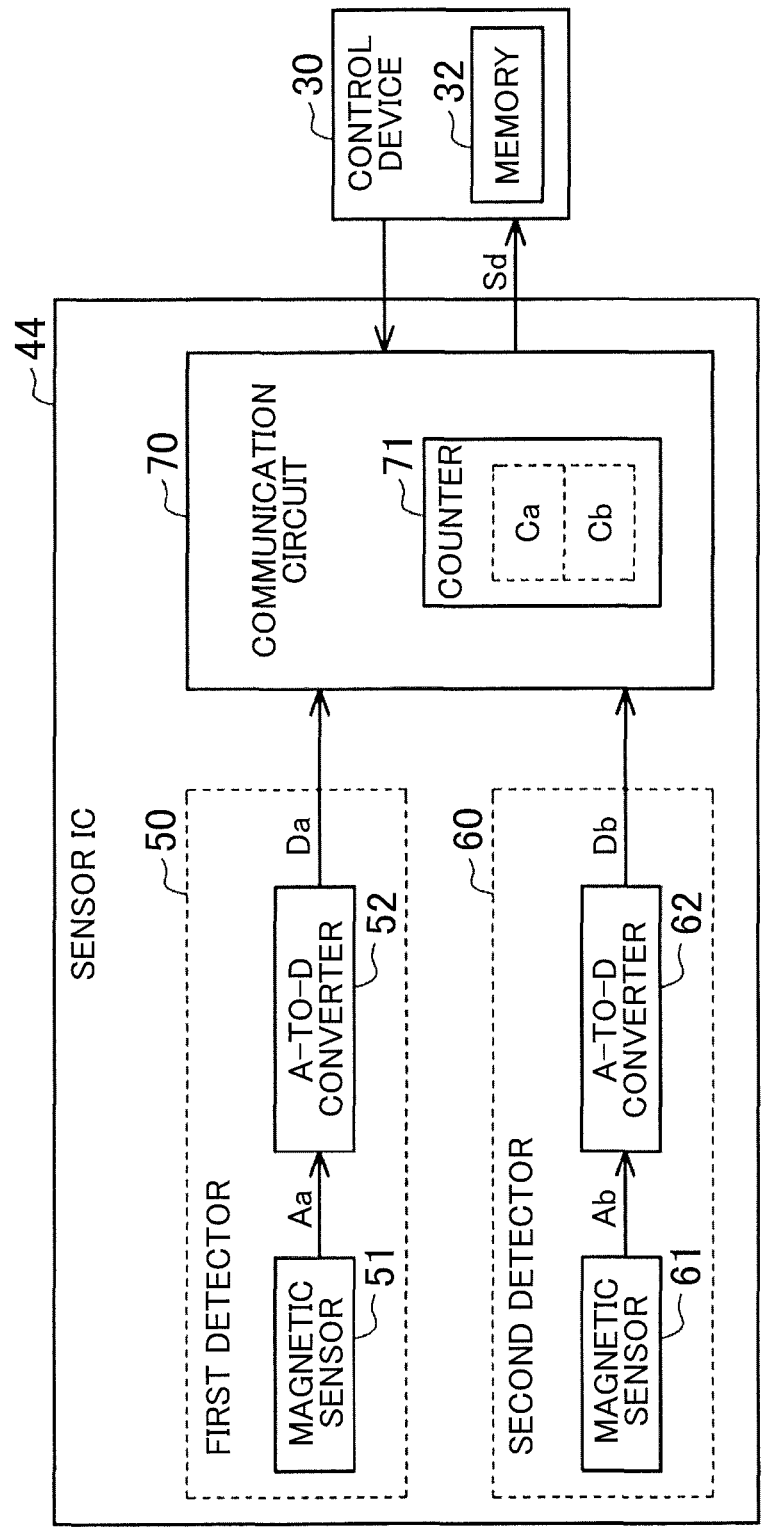
FIG. 4 is a block diagram showing the configuration of a sensor IC in the sensor system according to the embodiment.

The electric configuration of the sensor IC 44 will be described below. As shown in FIG. 4, the sensor IC 44 includes a first detector 50, a second detector 60, and a communication circuit 70.

The first detector 50 has a magnetic sensor 51, and an analog-to-digital (A-to-D) converter 52 serving as a signal processing circuit. The magnetic sensor 51 is formed by a Hall element. The magnetic sensor 51 detects the strength of a magnetic flux applied thereto and outputs an analog value Aa according to the detected strength of the magnetic flux to the A-to-D converter 52. The A-to-D converter 52 generates a first digital value Da by quantizing the analog value Aa received from the magnetic sensor 51 to a predetermined number of bits, and outputs the generated first digital value Da to the communication circuit 70. The first digital value Da of the present embodiment is a 13-bit digital value. As used herein, Da(0) to Da(12) represent bit information data of the first digital value Da sequentially from the most significant bit.

The second detector 60 has the same configuration as the first detector 50. That is, the second detector 60 has a magnetic sensor 61 and an A-to-D converter 62. The magnetic sensor 61 outputs an analog value Ab according to the strength of a magnetic flux applied thereto. The A-to-D converter 62 converts the analog value Ab received from the magnetic sensor 61 to a second digital value Db. In the case where both the first detector 50 and the second detector 60 are normal, the first digital value Da and the second digital value Db are substantially the same value. As used herein, Db(0) to Db(12) represent bit information data of the second digital value Db sequentially from the most significant bit.

The communication circuit 70 generates a detection signal Sd based on a transmission request from the control device 30 and transmits the detection signal Sd to the control device 30. A communication target of the communication circuit 70 of the present embodiment is therefore the control device 30. The transmission period of the detection signal Sd is set to, e.g., a period shorter than 500 μs. The detection signal Sd includes the first digital value Da, the second digital value Db, a first counter value Ca, a second counter value Cb, and an error-detecting code Edc. For example, a CRC value for a cyclic redundancy check (CRC), a parity bit for a parity check, etc. are used as the error-detecting code Edc. The first counter value Ca and the second counter value Cb are set as follows.

The communication circuit 70 has a counter 71. The communication circuit 70 increments or increases the first counter value Ca of the counter 71 every time it transmits the detection signal Sd including the first digital value Da to the control device 30. The communication circuit 70 increments the second counter value Cb of the counter 71 every time it transmits the detection signal Sd including the second digital value Db to the control device 30. Each of the first counter value Ca and the second counter value Cb is comprised of, e.g., two-bit information, and changes in order of 00, 01, 10, 11, 00, 01, . . . every time it is incremented.

The configuration of the detection signal Sd will be described in detail below. The detection signal Sd is formed by four frames F1 to F4. The frames F1 to F4 have the same configuration. Each frame F1 to F4 includes a start bit, data bits, and a parity bit in this order from the head. The data bits are nine-bit information. FIG. 5 shows the configuration of the data bits in each frame F1 to F4. In FIG. 5, D0 to D8 represent the data bits of each frame F1 to F4 from the start bit side.

Nine-bit bit information data Da(8) to Da(0) out of the bit information of the first digital value Da is sequentially placed in the data bits D0 to D8 of the first frame F1. Four-bit bit information data Db(3) to Db(0) out of the bit information of the second digital value Db is sequentially placed in the data bits D0 to D3 of the second frame F2. Four-bit bit information data Da(12) to Da(9) out of the bit information of the first digital value Da is sequentially placed in the data bits D4 to D7 of the second frame F2. Bit information Id is placed in the data bit D8 of the second frame F2. The bit information Id is used in order to identify sensor ICs in the case where there are a plurality of sensor ICs.

Nine-bit bit information data Db(12) to Db(4) out of the bit information of the second digital value Db is sequentially placed in the data bits D0 to D8 of the third frame F3. The first counter value Ca and the second counter value Cb are placed in the data bits D0 to D3 of the fourth frame F4. The error-detecting code Edc is placed in the data bits D4 to D8 of the fourth frame F4. The communication circuit 70 generates the error-detecting code Edc based on the bit information included in the first to fourth frames F1 to F4.

Figure 6:
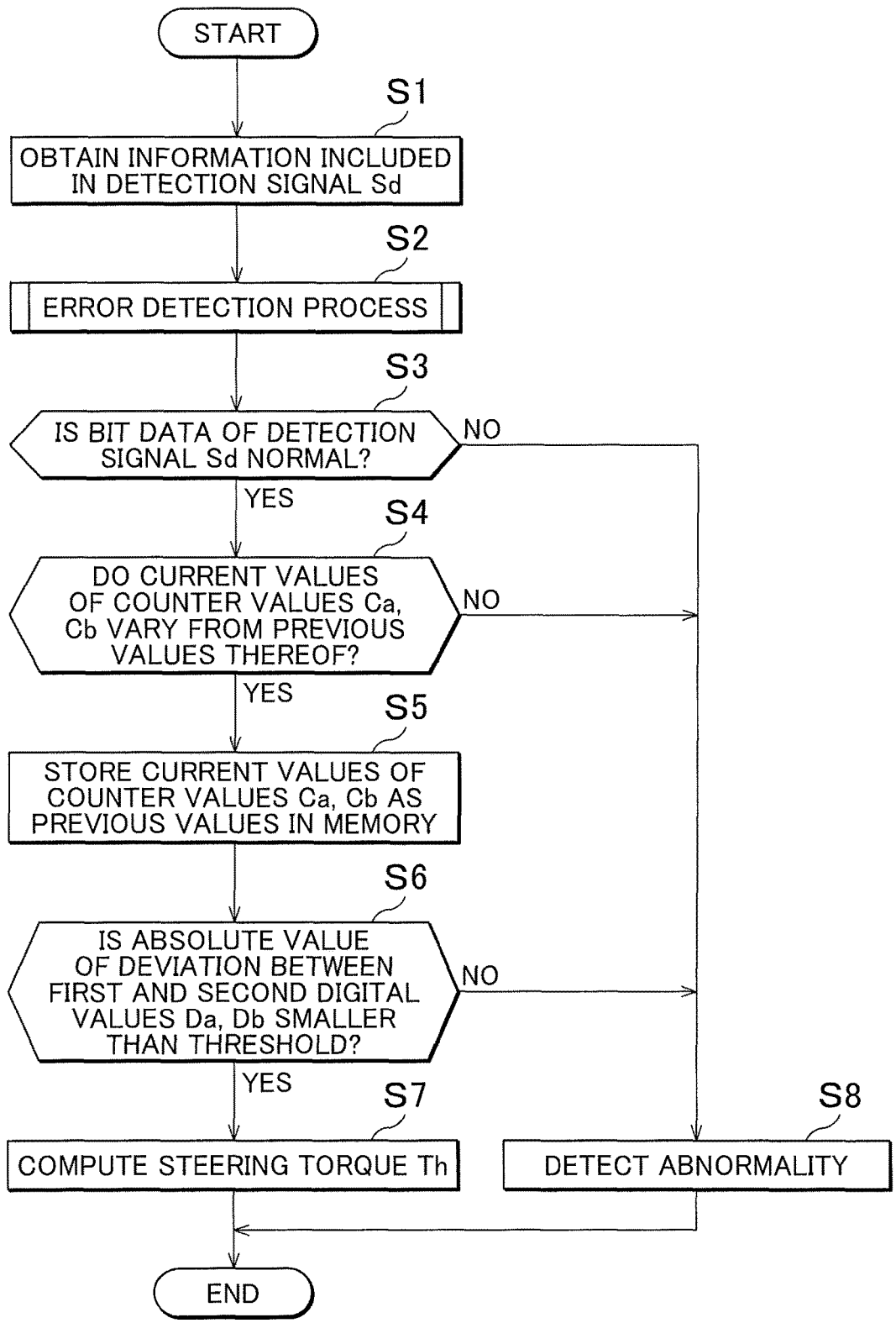
FIG. 6 is a flowchart illustrating processing that is performed by a control device of the sensor system according to the embodiment in response to the detection signal.

The communication circuit 70 thus forms the first to third frames F1 to F3 such that the data bits of the first digital value Da and the second digital value Db placed in the frames F1 to F3 are arranged in different orders between the first digital value Da and the second digital value Db. The control device 30 performs processing shown in FIG. 6 in response to the detection signal Sd from the sensor IC 44.

That is, the control device 30 first obtains information included in the detection signal Sd (S1) and then performs an error detection process based on the error-detecting code Edc (S2) to determine if the bit information of the detection signal Sd is normal (S3). If the bit information of the detection signal Sd is not normal, that is, if the bit information of the detection signal Sd has an error (S3: NO), the control device 30 detects abnormality (S8). For example, in this case, the control device 30 discards the received detection signal Sd and continues drive control of the motor 21 based on the previous detection signal Sd.

If the bit information of the detection signal Sd is normal (S3: YES), the control device 30 reads the previous values of the counter values Ca, Cb from a memory 32 and then determines if the current values of the counter values Ca, Cb vary from the previous values thereof (S4). If the current value of the first counter value Ca does not vary from the previous value thereof (S4: NO), the control device 30 detects abnormality (S8). Specifically, the control device 30 determines that the communication circuit 70 has fixing abnormality of the first digital value Da, namely such abnormality that it continues to transmit the same digital value as the first digital value Da. The reason for this will be described in detail later. Similarly, if the current value of the second counter value Cb does not vary from the previous value thereof (S4: NO), the control device 30 detects abnormality (S8). If such fixing abnormality occurs that the counter values Ca, Cb do not change, the digital values Da, Db may be abnormal values. The control device 30 therefore performs fail-safe control such as stopping drive control of the motor 21.

If the current values of the counter values Ca, Cb vary from the previous values thereof (S4: YES), the control device 30 stores the current values of the counter values Ca, Cb as the previous values in the memory 32 (S5). The control device 30 then determines if the absolute value of the deviation between the first and second digital values Da, Db is smaller than a threshold (S6). In the present embodiment, the absolute value of the deviation between the first and second digital values Da, Db in the case where both the first and second detectors 50, 60 are normal is measured in advance by experiments etc., and the threshold is set in advance based on the measurement result. For example, the threshold is set to a value that is larger than the maximum value of the absolute value of the deviation obtained by the measurement result by a predetermined value. If the absolute value of the deviation between the first and second digital values Da, Db is equal to or larger than the threshold (S6: NO), the control device 30 detects abnormality (S8). In this case, at least one of the first and second detectors 50, 60 may have abnormality. The control device 30 therefore performs fail-safe control such as stopping drive control of the motor 21.

If the absolute value of the deviation between the first and second digital values Da, Db is smaller than the threshold (S6: YES), the control device 30 determines that both the first and second detectors 50, 60 are normal, and computes the steering torque Th based on at least one of the first and second digital values Da, Db (S7). For example, the control device 30 computes the strength of the magnetic flux based on the first digital value Da, and computes the torsion angle of the torsion bar 12e based on the computed strength of the magnetic flux by using a map. The control device 30 also computes the steering torque Th by computation such as multiplying the computed torsion angle by the spring constant of the torsion bar 12e.

The sensor IC 44 and the torque sensor 40 according to the present embodiment can provide the following functions and effects.

(1) As shown in FIG. 7, if the communication circuit 70 has such abnormality that the data bit D3 in each frame F1 to F4 is fixed to "1," the bit information data Da(5) of the first digital value Da is fixed to "1," and the bit information data Db(0), Db(9) of the second digital value Db is fixed to "1." At this time, the first digital value Da and the second digital value Db are completely different values. Accordingly, when the control device 30 computes the deviation between the first and second digital values Da, Db in S6 of FIG. 6, the computed value of the deviation is equal to or larger than the threshold (S6: NO). The control device 30 can therefore detect the abnormality (S8). Even when the communication circuit 70 has such abnormality that a data bit other than the data bit D3 is fixed to a value, the control device 30 can similarly detect the abnormality of the communication circuit 70. Abnormality of the sensor IC 44 can thus be more accurately detected. As a result, abnormality of the torque sensor 40 can be more accurately detected.

(2) The control device 30 can determine if fixing abnormality of the digital values Da, Db included in the detection signal Sd has occurred or not by monitoring if the counter values Ca, Cb included in the detection signal Sd have changed. Abnormality of the sensor IC 44 can therefore be more accurately detected.

(3) The control device 30 can detect an error in the bit information of the digital values Da, Db and the counter values Ca, Cb in the first to fourth frames F1 to F4 based on the error-detecting code Edc in the fourth frame F4. This can improve accuracy of communication between the sensor IC 44 and the control device 30.

(4) The torque sensor 40 capable of more accurately detecting abnormality of the sensor IC 44 is mounted on the electric power steering system 1. This can avoid malfunction of the electric power steering system 1.

The present invention may also be carried out in the following other forms. Magnetic characteristics of the multipolar magnet 41a and output characteristics of the magnetic sensors 51, 61 tend to change according to the ambient temperature. It is therefore effective to use the configuration as shown in FIG. 8 for the first and second detectors 50, 60. That is, the first detector 50 further includes a temperature sensor 53, an A-to-D converter 54, and a logic circuit 55. The temperature sensor 53 detects the ambient temperature and outputs an analog value Ata according to the detected ambient temperature. The A-to-D converter 54 converts the analog value Ata received from the temperature sensor 53 to a temperature digital value Dta. The logic circuit 55 performs temperature compensation of the first digital value Da based on the temperature digital value Dta and outputs the resultant first digital value Da' to the communication circuit 70. The A-to-D converters 52, 54 and the logic circuit 55 form a signal processing circuit 56 of the first detector 50.

Like the first detector 50, the second detector 60 further includes a temperature sensor 63, an A-to-D converter 64, and a logic circuit 65. The temperature sensor 63 outputs an analog value Atb according to the ambient temperature. The A-to-D converter 64 converts the analog value Atb to a temperature digital value Dtb. The logic circuit 65 performs temperature compensation of the second digital value Db based on the temperature digital value Dtb and outputs the resultant second digital value Db' to the communication circuit 70. The A-to-D converters 62, 64 and the logic circuit 65 form a signal processing circuit 66 of the second detector 60. The communication circuit 70 generates the detection signal Sd based on the first digital value Da' and the second digital value Db'. In this configuration, the control device 30 computes the torsion angle of the torsion bar 12e based on the temperature-compensated first and second digital values Da', Db'. Accordingly, a more accurate torsion angle can be computed, and the steering torque Th can be more accurately detected.

The configuration of the signal processing circuits 56, 66 in FIG. 8 can be modified as appropriate. For example, the signal processing circuits 56, 66 may be formed by a digital signal processor (DSP). The number of bits of the first and second digital values Da, Db is not limited to 13 bits, but may be changed as appropriate.

The number of detectors included in the sensor IC 44 is not limited to two, but may be three or more. The number of digital values included in the detection signal Sd may be changed as appropriate according to the number of detectors. The configuration of the frames F1 to F4 of the detection signal Sd is not limited to that shown in FIG. 5, but may be modified as appropriate. The number of frames of the detection signal Sd is not limited to four, but may be changed as appropriate. In other words, the communication circuit 70 may have any configuration which transmits a plurality of digital values in a plurality of frames and which forms the frames such that bit information data of the plurality of digital values placed in the plurality of frames is arranged in different orders between or among the plurality of digital values.

The communication circuit 70 of the above embodiment uses the first counter value Ca and the second counter value Cb for the first digital value Da and the second digital value Db. However, the communication circuit 70 may use only one counter value. That is, the communication circuit 70 increments a single counter value every time it transmits the detection signal Sd including the first digital value Da and the second digital value Db. The communication circuit 70 may include this counter value in the detection signal Sd instead of the first and second counter values Ca, Cb of the above embodiment.

The communication circuit 70 may have a configuration that does not use the first and second counter values Ca, Cb. That is, the first and second counter values Ca, Cb may be eliminated from the detection signal Sd. In this case, the counter 71 can be eliminated from the communication circuit 70, whereby the configuration of the communication circuit 70 can be simplified.

The communication circuit 70 may use an error-correcting code instead of the error-detecting code Edc. The communication target of the communication circuit 70 is not limited to the control device 30 of the electric power steering system 1. Any device may be used as the communication target of the communication circuit 70.

The configuration of the torque sensor 40 may be modified as appropriate. For example, the position of the torsion bar 12e is not limited to the column shaft 12a, but may be changed to any position in the steering shaft 12. The structure of the magnetic circuit 47 may also be modified as appropriate.

The control device 30 may be included in the torque sensor 40 of the above embodiment. The configuration of the sensor IC 44 of the above embodiment is not limited to the sensor IC of the torque sensor, but may be applied to a sensor IC of an appropriate sensor device such as a sensor IC of a rotation angle sensor. In this case, each detector of the sensor IC may include, e.g., a magneto-resistive (MR) sensor that outputs an analog value according to the direction of a magnetic flux applied thereto, a sensor that detects a physical quantity other than a magnetic flux, etc., instead of the magnetic sensor formed by the Hall element. In other words, the configuration similar to the sensor IC 44 of the above embodiment can be used as long as a sensor IC includes a plurality of detectors that detect the same physical quantity of the same detection target and outputs a digital value according to the detected physical quantity, and a communication circuit that transmits the plurality of digital values received from the plurality of detectors to a communication target.

What is claimed is:

1. A sensor system, comprising:
   a plurality of detectors, each of the plurality of detectors:
   (i) detecting the same physical quantity of the same detection target, and (ii) outputting a digital value according to the detected physical quantity, the physical quantity being a magnetic flux applied to the plurality of detectors,
   wherein the physical quantity of the detection target is a steering torque that is applied to a steering shaft of a vehicle;
   a communication circuit that transmits a plurality of digital values, the plurality of digital values including each digital value received from each of the plurality of detectors;
   a torsion bar that is provided at an intermediate position in the steering shaft of the vehicle;
   a magnetic circuit that changes the magnetic flux applied to the plurality of detectors according to a torsion angle of the torsion bar; and
   an arithmetic unit that receives the plurality of digital values from the communication circuit and computes torque that is applied to the torsion bar based on the received plurality of digital values, wherein
   each of the plurality of detectors includes a magnetic sensor that detects the magnetic flux applied to the plurality of detectors and outputs an analog value according to the detected magnetic flux, and a signal processing circuit that generates the digital value based on the analog value received from the magnetic sensor,
   the communication circuit places the plurality of digital values in a plurality of frames to transmit the plurality of frames, and forms the plurality of frames such that bit information data of the plurality of digital values placed in the plurality of frames is arranged in different orders between or among the plurality of digital values,
   one frame of the plurality of frames includes: (i) counter values that change every time the plurality of frames including the plurality of digital values are transmitted from the communication circuit to the arithmetic unit, and (ii) error-detecting code or error-correcting code generated by the communication circuit, and
   the plurality of frames other than the one frame includes the plurality of digital values.

2. The sensor system according to claim 1, wherein the counter values are set for each of the plurality of digital values.

3. The sensor system according to claim 1, wherein the arithmetic unit calculates an absolute value of a deviation of the plurality of digital values according to the detected physical quantity, and determines that there is an abnormality if the absolute value is equal to or larger than a predetermined threshold.

4. The sensor system according to claim 1, further comprising:
   at least one temperature detector; and
   a plurality of correction circuits, wherein
   each of the plurality of correction circuits performs temperature compensation of the plurality of digital values, respectively, according to the same physical quantity of the same detection target which are received from the plurality of detectors, based on an output of the temperature detector, and
   the communication circuit transmits the temperature-compensated digital values.

5. The sensor system according to claim 1, wherein the communication circuit generates the error-detecting code or the error-correcting code based on the bit information data included in the plurality of frames.

6. The sensor system according to claim 1, wherein the detection target is an electric power steering system.

* * * * *